(12) United States Patent
Chen et al.

(10) Patent No.: US 11,641,308 B2
(45) Date of Patent: *May 2, 2023

(54) SOFTWARE DEFINED NETWORKING ORCHESTRATION METHOD AND SDN CONTROLLER

(71) Applicant: HUAWEI TECHNOLOGIES CO., LTD., Guangdong (CN)

(72) Inventors: Zhifeng Chen, Nanjing (CN); Xuefeng Wu, Beijing (CN); Weisheng Wang, Shenzhen (CN); Chenghao Li, Nanjing (CN)

(73) Assignee: HUAWEI TECHNOLOGIES CO., LTD., Guangdong (CN)

(\*) Notice: Subject to any disclaimer, the term of this patent is extended or adjusted under 35 U.S.C. 154(b) by 0 days.

This patent is subject to a terminal disclaimer.

(21) Appl. No.: 17/486,117

(22) Filed: Sep. 27, 2021

(65) Prior Publication Data

US 2022/0086047 A1  Mar. 17, 2022

Related U.S. Application Data

(63) Continuation of application No. 16/698,648, filed on Nov. 27, 2019, now Pat. No. 11,146,451, which is a (Continued)

(30) Foreign Application Priority Data

May 31, 2017 (CN) .......................... 201710400330.3

(51) Int. Cl.
*H04L 41/08* (2022.01)
*H04L 41/0893* (2022.01)
(Continued)

(52) U.S. Cl.
CPC ...... *H04L 41/0886* (2013.01); *H04L 41/0893* (2013.01); *H04L 45/64* (2013.01); *H04L 49/252* (2013.01)

(58) Field of Classification Search
CPC . H04L 41/0886; H04L 41/0893; H04L 45/64; H04L 49/252; H04L 41/0806;
(Continued)

(56) References Cited

U.S. PATENT DOCUMENTS 8,199,750 B1  6/2012  Schultz et al.
8,953,439 B1  2/2015  Lin et al.
(Continued)

FOREIGN PATENT DOCUMENTS

CN  103428771 A  12/2013
CN  103997513 A  8/2014
(Continued)

OTHER PUBLICATIONS

ETS1 GS NFV-SWA001 V1.1.1 (Dec. 2014),Network Functions Virtualisation (NFV) Virtual Network Functions Architecture,total 93 pages.

*Primary Examiner* — Michael A Keller
(74) *Attorney, Agent, or Firm* — Womble Bond Dickinson (US) LLP

(57) ABSTRACT

A SDN orchestration method includes: obtaining a first request for creating a first logical switch; creating a control plane instance of the first logical switch, and sending first configuration information to instruct the first forwarding device to configure the data plane instance of the first logical switch; obtaining a second request for connecting the first logical switch to a first logical router; sending second configuration information to instruct the first forwarding device to configure a first port of the data plane instance of the first logical switch to be communicatively connected to (Continued)

a second port of a data plane instance of the first logical router on the second forwarding device configured with the data plane instance of the first logical router; and sending third configuration information to instruct the second forwarding device to configure the second port to be communicatively connected to the first port.

20 Claims, 7 Drawing Sheets

Related U.S. Application Data continuation of application No. PCT/CN2018/074471, filed on Jan. 29, 2018.

(51) Int. Cl.
*H04L 45/64* (2022.01)
*H04L 49/25* (2022.01)

(58) Field of Classification Search
CPC ..... H04L 29/08; H04L 41/0823; H04L 49/10; H04L 49/253; H04L 49/30; H04L 67/04; H04L 67/30; H04L 67/327
See application file for complete search history.

(56) References Cited

U.S. PATENT DOCUMENTS

| | | |
|---|---|---|
| 2014/0122681 A1 | 5/2014 | Imai |
| 2014/0226467 A1 | 8/2014 | Park |
| 2015/0043382 A1 | 2/2015 | Arora et al. |
| 2015/0271011 A1* | 9/2015 | Neginhal ............ H04L 41/0895 370/254 |
| 2015/0281067 A1 | 10/2015 | Wu |
| 2016/0291999 A1* | 10/2016 | Antony ............... G06F 9/45558 |
| 2016/0337272 A1 | 11/2016 | Berman |
| 2017/0163599 A1 | 6/2017 | Shen et al. |
| 2017/0180213 A1 | 6/2017 | Li et al. |
| 2017/0289030 A1 | 10/2017 | Lu et al. |
| 2017/0317974 A1 | 11/2017 | Masurekar et al. |
| 2018/0109471 A1* | 4/2018 | Chang .................... H04L 49/70 |
| 2018/0183725 A1 | 6/2018 | Ben-Hagai |
| 2018/0241622 A1 | 8/2018 | Chanda et al. |
| 2018/0302314 A1 | 10/2018 | Wan et al. |

FOREIGN PATENT DOCUMENTS

| | | |
|---|---|---|
| CN | 105391568 A | 3/2016 |
| EP | 2911347 A1 | 8/2015 |
| EP | 3059909 A1 | 8/2016 |

* cited by examiner

SOFTWARE DEFINED NETWORKING ORCHESTRATION METHOD AND SDN CONTROLLER

CROSS-REFERENCE TO RELATED APPLICATIONS

This application is a continuation of U.S. patent application Ser. No. 16/698,648, filed on Nov. 27, 2019, which is a continuation of International Application No. PCT/CN2018/074471, filed on Jan. 29, 2018, which claims priority to Chinese Patent Application No. 201710400330.3, filed on May 31, 2017. All of the aforementioned applications are hereby incorporated by reference in their entireties.

TECHNICAL FIELD

This application relates to the field of communications technologies, and in particular, to a software defined networking orchestration method and an SDN controller.

BACKGROUND

Software defined networking (Software Defined Network, SDN) is an innovative network architecture that is capable of getting rid of limitations of hardware on the network architecture, and modifying a network like upgrading or installing software. In essence, SDN is software-based networking. In comparison with a prior network architecture, SDN can implement various functions in a network in a better and simpler way.

OpenStack is an open-source infrastructure as a service (Infrastructure as a Service, IaaS) cloud computing platform that allows anyone to establish and provide their own cloud computing services. The Neutron model provided by the OpenStack community is a most widely used SDN network service model at present. This model uses a virtualization technology to virtualize a conventional network into logical networks, and pushes management functions on the logical networks to a user side, implementing flexible networking, operation and maintenance, and application. When orchestrating an SDN network by using the Neutron model, a user needs to create logical routers, logical networks, logical subnets, logical ports, and the like, and then perform operations such as associating the logical subnets with the logical routers.

The Neutron model focuses on service capabilities of an SDN network. This requires that a user have a deep understanding of service capabilities of the network in order to orchestrate the SDN network by using the Neutron model.

SUMMARY

This application provides a software defined networking orchestration method and an SDN controller, to provide a new method for orchestrating an SDN network, so as to help a user orchestrate an SDN network.

According to a first aspect, this application provides a software defined networking orchestration method, including: obtaining, by an SDN controller, a first request for creating a first logical switch, where the first request may be sent by a platform, or a user may directly enter a command into the SDN controller to generate the first request; in response to the first request, creating, by the SDN controller, a control plane instance of the first logical switch, determining to deploy a data plane instance of the first logical switch on a first forwarding device, and sending first configuration information to the first forwarding device, where the first configuration information is used to instruct the first forwarding device to configure the data plane instance of the first logical switch, the control plane instance of the first logical switch is used to run a communications protocol, generate a forwarding rule table, and send the forwarding rule table to the data plane instance of the first logical switch, and the data plane instance of the first logical switch is used to perform data forwarding according to the forwarding rule table; and configuring, by the first forwarding device according to the first configuration information, the data plane instance of the first logical switch. Then, the SDN controller obtains a second request for connecting the first logical switch to a first logical router; and in response to the second request, the SDN controller sends second configuration information to the first forwarding device, and sends third configuration information to a second forwarding device configured with a data plane instance of the first logical router, where the second configuration information is used to instruct the first forwarding device to configure a first port of the data plane instance of the first logical switch to be communicatively connected to a second port of the data plane instance of the first logical router on the second forwarding device, and the third configuration information is used to instruct the second forwarding device to configure the second port to be communicatively connected to the first port. That the first port is communicatively connected to the second port indicates that a communicative connection is established between the first port and the second port. Data can be transmitted between the data plane instance of the first logical router and the data plane instance of the first logical switch through the communicative connection between the first port and the second port. In some embodiments, when the SDN controller receives the second request, the first forwarding device has not created the first port. In this case, the SDN controller first sends, to the first forwarding device, configuration information instructing the first forwarding device to create the first port, and sends the second configuration information to the first forwarding device after the first port is created successfully. In some embodiments, when the SDN controller receives the second request, the second forwarding device has not created the second port. In this case, the SDN controller first sends, to the second forwarding device, configuration information instructing the second forwarding device to create the second port, and sends the third configuration information to the second forwarding device after the second port is created successfully.

With this method, logical switches can be created and connected to logical routers, to form an SDN network. Because functions of a logical router and a logical switch may be corresponding to those of a physical router and a physical switch, this makes it easy for a user to understand an SDN network architecture, and helps the user orchestrate an SDN network. In addition, when an SDN network is orchestrated based on logical routers and logical switches, an existing network management system and existing tools can be conveniently transplanted into the SDN network, facilitating the ease of detection, configuration, testing, and the like of SDN network elements.

With reference to the first aspect, in a first possible implementation of the first aspect, the SDN network orchestration method further includes: obtaining, by the SDN controller, a third request for connecting a first logical host to the first logical switch; in response to the third request, sending fourth configuration information to a computing device configured with an instance of the first logical host, where the fourth configuration information is used to instruct the computing device to configure a third port of the instance of the first logical host to be communicatively connected to a fourth port of the data plane instance of the first logical switch on the first forwarding device; and sending fifth configuration information to the first forwarding device, where the fifth configuration information is used to instruct the first forwarding device to configure the fourth port to be communicatively connected to the third port. In some embodiments, when the SDN controller receives the third request, the computing device has not created the third port. In this case, the SDN controller first sends, to the computing device, configuration information instructing the computing device to create the third port, and sends the fourth configuration information to the computing device after the third port is created successfully. In some embodiments, when the SDN controller receives the third request, the first forwarding device has not created the fourth port. In this case, the SDN controller first sends, to the first forwarding device, configuration information instructing the first forwarding device to create the fourth port, and sends the fifth configuration information to the first forwarding device after the fourth port is created successfully. The logical host can be quickly connected to the SDN network by using this technical solution.

With reference to the first possible implementation of the first aspect, in a second possible implementation of the first aspect, a manner of obtaining the third request by the SDN controller is: The SDN controller receives a fourth request for connecting the first logical host to an SDN network, determines, based on a topology structure of a physical network, to connect the instance of the first logical host to the data plane instance of the first logical switch on the first forwarding device, and generates the third request for connecting the first logical host to the first logical switch, so as to obtain the third request. In this implementation, a platform or a user may not specify which logical switch the logical host is connected to, and the SDN controller determines the logical switch to which the logical host is connected. The determining may have a plurality of implementations. For example, the SDN controller determines to connect the logical host to a data plane instance of a logical switch on a forwarding device that is relatively close to a computing device on which the instance of the logical host is located, or connect the logical host to a data plane instance of a logical switch on a forwarding device with a relatively light load. In this technical solution, the user may not specify a logical switch to which the logical host is connected, to simplify operations of the user to orchestrate the SDN network. In addition, the logical switch to which the logical host is connected and that is determined by the SDN controller based on the topology structure of the physical network can provide better data transmission services for the logical host.

With reference to any possible implementation of the first aspect to the second possible implementation of the first aspect, in a third possible implementation of the first aspect, the first request carries information about a designated forwarding device. The SDN controller obtains the information about the designated forwarding device from the first request, and determines to deploy the data plane instance of the first logical switch on the designated forwarding device. There may be one or more designated forwarding devices. When there are a plurality of designated forwarding devices, the first forwarding device is any one of the plurality of designated forwarding devices.

With reference to any possible implementation of the first aspect to the second possible implementation of the first aspect, in a fourth possible implementation of the first aspect, the first request does not carry information about a designated forwarding device, and the SDN controller assigns a forwarding device for deployment of the data plane instance of the first logical switch. For example, when the first request is sent by the platform to the SDN controller, the SDN controller may select a forwarding device that is relatively close to the platform as the first forwarding device for deployment of the data plane instance of the first logical switch, so that the first logical switch can respond to a data transmission requirement of the platform more rapidly. A distance between the forwarding device and the platform is a physical distance or a logical distance between the forwarding device and a server implementing functions of the platform. A logical distance between two devices may be measured by a quantity of intermediate network elements in a path between the two devices. When two devices are connected directly, the quantity of intermediate network elements is 0, and the logical distance is the shortest, followed by the logical distance when the two devices are connected via one intermediate network element, and so on. For another example, the first request may carry information about a logical service that the first logical switch needs to be associated with. The SDN controller determines a forwarding device capable of providing the logical service or a forwarding device that is relatively close to a service server providing the logical service, as the first forwarding device for deployment of the data plane instance of the first logical switch, so as to better satisfy service requirements of the user on the first logical switch. For still another example, the SDN controller determines a forwarding device with a relatively light load currently as a forwarding device for deployment of the data plane instance of the first logical switch. In this technical solution, the user may not specify a forwarding device for deployment of the data plane instance of the logical switch, to simplify operations of the user to orchestrate the SDN network. In addition, the forwarding device that is determined by the SDN controller based on the topology structure of the physical network, for deployment of the data plane instance of the first logical switch can better implement a data transmission function of the first logical switch.

With reference to any possible implementation of the first aspect to the fourth possible implementation of the first aspect, in a fifth possible implementation of the first aspect, the SDN controller may further determine to deploy the data plane instance of the first logical switch on a third forwarding device, and send sixth configuration information to the third forwarding device, where the sixth configuration information is used to instruct the third forwarding device to configure the data plane instance of the first logical switch. Thereby, a plurality of data plane instances are configured for one logical switch, improving capability and reliability of data forwarding of the logical switch.

With reference to the fifth possible implementation of the first aspect, in a sixth possible implementation of the first aspect, the first configuration information is further used to instruct the first forwarding device to configure a fifth port of the first logical switch that is configured by the first forwarding device to be communicatively connected to a sixth port of the data plane instance of the first logical switch on the third forwarding device, and the sixth configuration information is further used to instruct the third forwarding device to configure the sixth port to be communicatively connected to the fifth port. In this implementation, different data plane instances of one logical switch can be connected, thereby improving flexibility and reliability of data forwarding.

With reference to any possible implementation of the first aspect to the sixth possible implementation of the first aspect, in a seventh possible implementation of the first aspect, if the first logical switch has a plurality of data plane instances, when the first logical switch is connected to the first logical router, one or more or all data plane instances of the first logical switch may be connected to the data plane instance of the first logical router. To be specific, a port of the one or more or all data plane instances of the first logical switch is communicatively connected to a port of the data plane instance of the first logical router. In turn, if the first logical router has a plurality of data plane instances, when the first logical switch is connected to the first logical router, a port of one or more or all data plane instances of the first logical router may be communicatively connected to a port of the data plane instance of the first logical switch.

With reference to any possible implementation of the first aspect to the seventh possible implementation of the first aspect, in an eighth possible implementation of the first aspect, one forwarding device may configure data plane instances of different logical switches, and/or one forwarding device may configure data plane instances of different logical routers, and/or one forwarding device may configure both a data plane instance of a logical router and a data plane instance of a logical switch.

With reference to the eighth possible implementation of the first aspect, in a ninth possible implementation of the first aspect, if the first forwarding device is deployed with both the data plane instance of the first logical switch and the data plane instance of the first logical router, when the first logical switch is connected to the first logical router, the SDN controller may communicatively connect the port of the data plane instance of the first logical switch on the first forwarding device to the port of the data plane instance of the first logical router on the first forwarding device. Because both the data plane instance of the first logical switch and the data plane instance of the first logical router are located on the first forwarding device, time consumed for data transmission between the first logical switch and the first logical router can be reduced, and data transmission efficiency of the SDN network can be improved.

With reference to any possible implementation of the first aspect to the ninth possible implementation of the first aspect, in a tenth possible implementation of the first aspect, the SDN network orchestration method further includes: obtaining, by the SDN controller, a sixth request for associating the first logical switch with a first logical service; in response to the six request, determining an access port of an instance of the first logical service; and sending eighth configuration information to the first forwarding device, where the eighth configuration information is used to instruct the first forwarding device to configure a seventh port of the data plane instance of the first logical switch to be communicatively connected to the access port. In this technical solution, the SDN controller communicatively connects a port of a logical forwarding device to a port of a logical service, thereby associating the logical forwarding device with the logical service.

With reference to any possible implementation of the first aspect to the tenth possible implementation of the first aspect, in an eleventh possible implementation of the first aspect, the platform sends, to the SDN controller, a request for creating a logical network, the SDN controller saves information about the logical network, for example, an identifier of a logical router to which the logical network is connected, and an identifier of the logical network, and then returns, to the platform, a message about successful creation of the logical network. Then, the platform sends, to the SDN controller, a request for creating a logical subnet of the logical network, and the SDN controller determines, based on the request for creating a logical subnet and the saved information about the logical network, to create the first logical switch, and obtains the first request for creating the first logical switch. In this technical solution, the SDN controller can support a platform in orchestrating an SDN network based on a service model of the platform itself, thereby improving compatibility of the SDN controller with existing platforms.

With reference to the eleventh possible implementation of the first aspect, in a twelfth possible implementation of the first aspect, if the request for creating a logical network carries a message indicating that the logical network is connected to the first logical router, the SDN controller may perform the step of connecting the first logical switch to the first logical router, after the first logical switch is successfully created, so as to improve efficiency of SDN network orchestration.

According to a second aspect, this application provides an SDN controller. The SDN controller is configured to execute the method in the first aspect or any possible implementation of the first aspect. Specifically, the SDN controller includes a module configured to execute the method in the first aspect or any possible implementation of the first aspect.

According to a third aspect, this application provides an SDN controller, including a processor, a memory, and a communications interface, where the memory stores a computer instruction, the communications interface is configured to communicate with devices other than the SDN controller, and the processor is connected to the memory and the communications interface, and is configured to call the computer instruction stored in the memory to execute the method in the first aspect or any possible implementation of the first aspect.

According to a fourth aspect, this application provides an SDN communications system, and the system includes an SDN controller and a platform. The platform is configured to send an SDN network orchestration request to the SDN controller, and the SDN controller is configured to execute the method in the first aspect or any possible implementation of the first aspect in response to the SDN network orchestration request sent by the platform. Further, the system may further include a forwarding device, and the forwarding device is configured to work according to configuration information sent by the SDN controller.

According to a fifth aspect, this application further provides a computer readable storage medium, where the readable storage medium stores a computer instruction, and when the instruction is run on a computer, the computer executes the method in the first aspect or any possible implementation of the first aspect.

Based on the implementations provided in the foregoing aspects, further combinations may be obtained to provide more implementations.

DESCRIPTION OF EMBODIMENTS

To make the objectives, technical solutions, and advantages of this application clearer, the following further describes this application in detail with reference to the accompanying drawings.

This application provides a software defined networking orchestration method and an SDN controller, to provide a new method for orchestrating an SDN network, so as to help a user orchestrate an SDN network. The method and the apparatus are based on a same invention idea. Because the method and the SDN controller employ similar problem-solving principles, mutual reference may be made to implementation of the apparatus and the method, and repetition is avoided.

It should be understood that "a plurality of" used in this application means two or more than two. In addition, in descriptions of this application, the terms such as "first" and "second" are used only for a distinguishing purpose, and shall not be understood as an indication or implication of relative importance, or understood as an indication or implication of an order.

Figure 1:
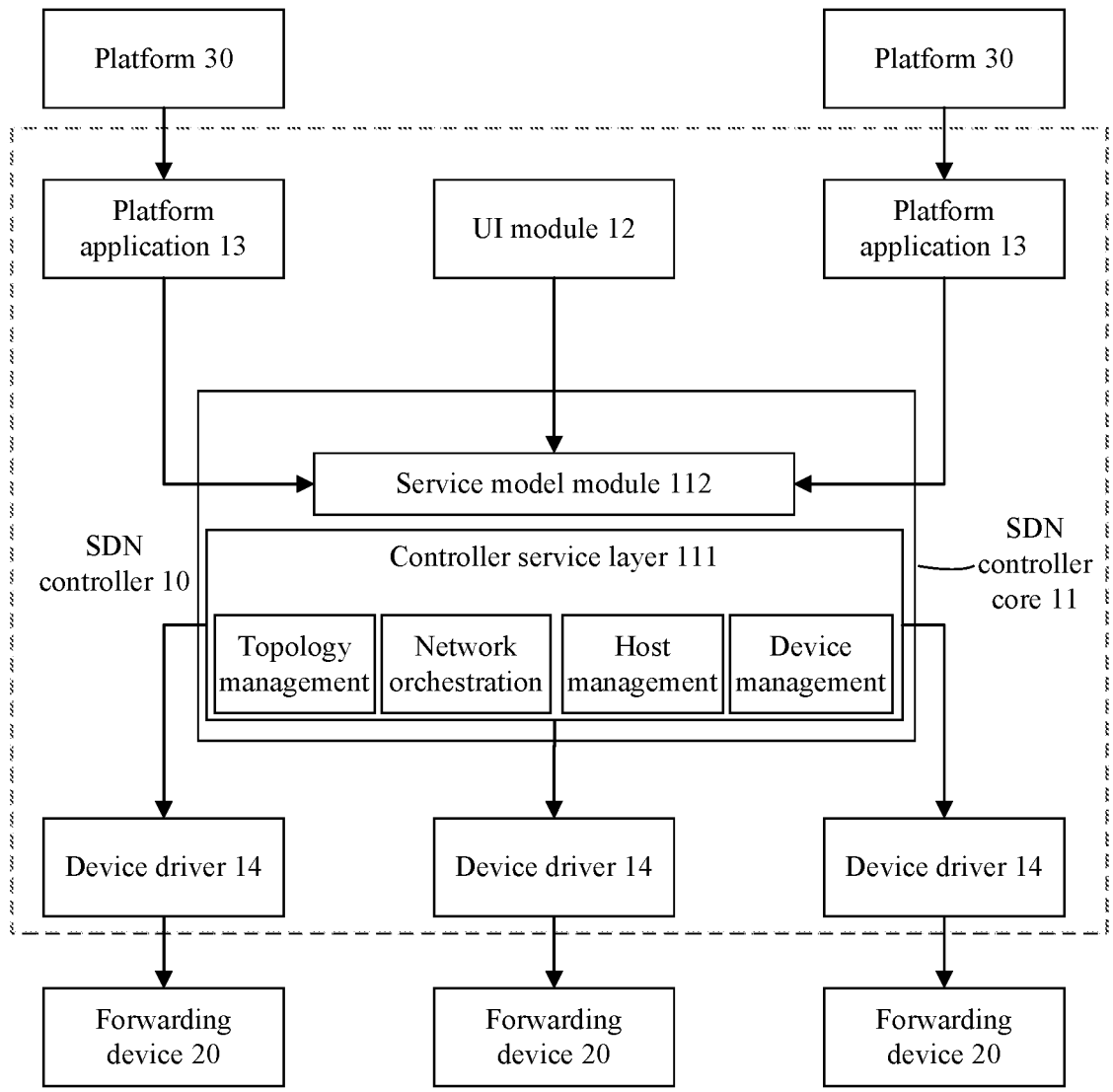
FIG. 1 is a schematic diagram of a management network system according to an embodiment of this application.

A so-called network service model includes an interaction mode between logical networks, a network policy, service classes, a service scheduling policy, and the like. The network service model is oriented toward user requirements, and is irrelevant to an implementation technology or a physical network. For example, the network service model defines how a user orchestrates an SDN network. FIG. 1 is a schematic diagram of a management network system according to an embodiment of this application. The system includes: an SDN controller 10, forwarding devices 20, and platforms 30. The forwarding device 20 may be a physical switch, a physical router, or the like. The platform 30 may be a cloud platform, a network management platform, a computing platform, or the like. The SDN controller 10 is located between the forwarding devices 20 and the platforms 30, and is responsible for mapping from logical networks to a physical network, so that the physical network that includes the forwarding devices 20 provides services for the platforms 30. The SDN controller 10 may be implemented by one or more chips. These chips may be located in one physical device, or may be located in different physical devices. Alternatively, the SDN controller 10 may be implemented by a processor by running computer program instructions. Different modules of the SDN controller 10 may be implemented by a processor of one physical device by running a computer program, or may be implemented by processors of different physical devices by running a computer program. The platform 30 may be implemented by one server or a cluster of a plurality of servers. Specifically, the platform 30 may be implemented by a hardware chip in a server, or may be implemented by a processor of a server by running a computer program.

Optionally, the SDN controller 10 includes a core 11 of the SDN controller 10, a user interface (User Interface, UI) module 12, platform applications 13, and device drivers 14. The SDN controller core 11 includes a controller service layer 111 and a service model module 112, where the controller service layer 111 is configured to orchestrate an SDN network based on user requirements. Optionally, the controller service layer 111 may further provide a plurality of functions such as topology management, host management, and device management. The service model module 112 is configured to provide network service models, and generate an application programming interface (Application Programming Interface, API) for each network service model, for call by modules such as the UI module 12 and the platform applications 13. The UI module 12 is configured to provide a user with an interface for network orchestration so that the user can orchestrate a network based on operable objects provided by the UI module 12. A UI provided by the UI module 12 may be a graphical interface. The platform application 13 is configured to convert a configuration model of the platform 30 into a uniform service model, and send the service model resulting from the conversion to the service model module 112, and the service model module 112 can provide this resulting service model to the outside. The device driver 14 is configured to convert configuration information delivered by the controller service layer 111 to a physical forwarding device into a form supported by the physical forwarding device.

In the embodiments of this application, logical routers and logical switches may be collectively referred to as logical forwarding devices. A logical forwarding device includes a control plane instance and a data plane instance. The control plane instance of the logical forwarding device is deployed on the SDN controller 10, and is used to run a communications protocol, generate a forwarding rule table, and send the forwarding rule table to the data plane instance of the logical forwarding device. The data plane instance of the logical forwarding device is deployed on a physical forwarding device, and is used to perform data forwarding according to the forwarding rule table delivered by the control plane instance of the logical forwarding device. A forwarding rule table generated by a control plane instance of a logical switch is a forwarding table, whereas a forwarding rule table generated by a control plane instance of a logical router is a routing table. For ease of description, a "physical forwarding device" is briefly referred to as a "forwarding device" in the embodiments of this application.

Figure 2:
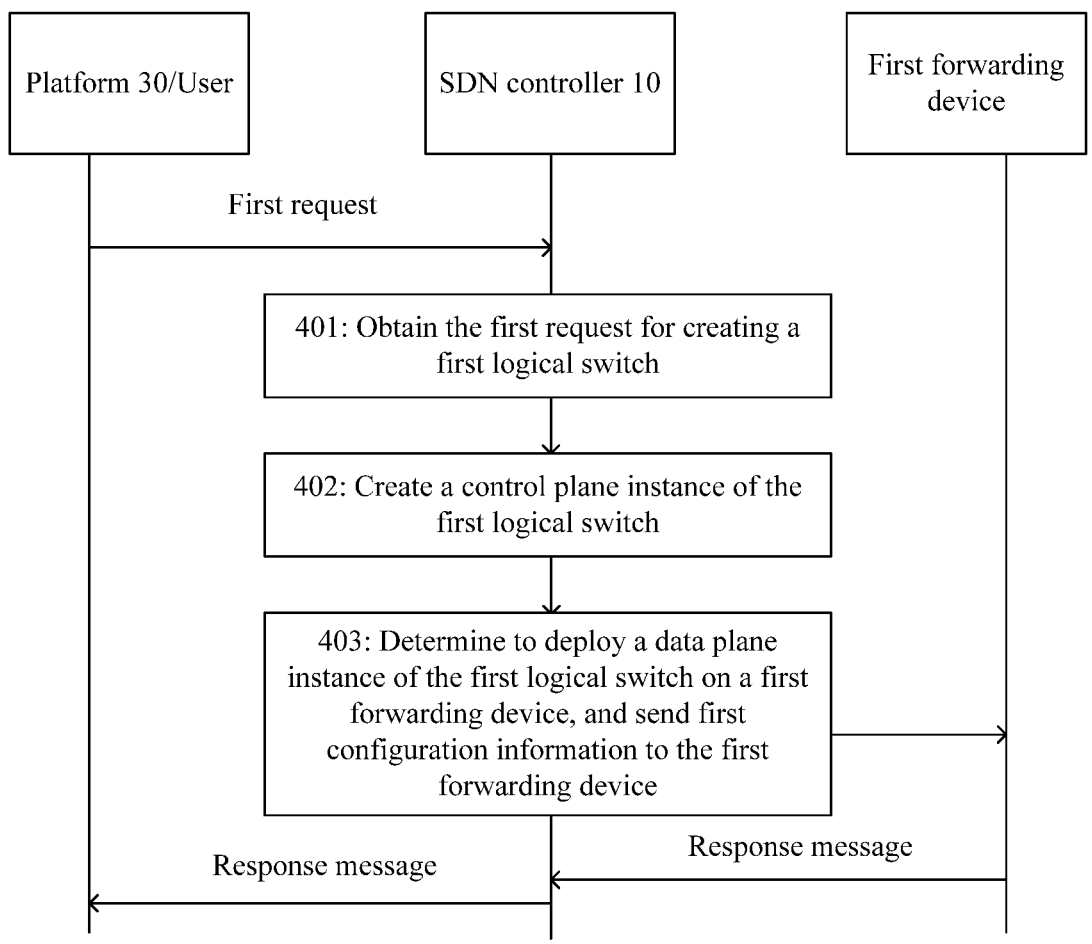
FIG. 2 is a flowchart of creating a first logical switch according to an embodiment of this application.

The following uses creation of a logical switch as an example to introduce a creating process of a logical forwarding device. With reference to FIG. 2, a logical switch creating process includes the following steps.

Step 401: An SDN controller 10 obtains a first request for creating a first logical switch. The first request may be sent by a platform 30. Alternatively, a user may directly enter a command into the SDN controller 10, for example, perform a command line operation on and enter a command into the SDN controller 10, to generate the first request.

Step 402: The SDN controller 10 creates a control plane instance of the first logical switch.

Step 403: The SDN controller 10 determines to deploy a data plane instance of the first logical switch on a first forwarding device, and sends first configuration information to the first forwarding device, where the first configuration information is used to instruct the first forwarding device to configure the data plane instance of the first logical switch; the control plane instance of the first logical switch is used to run a communications protocol, generate a forwarding rule table, and send the forwarding rule table to the data plane instance of the first logical switch; and the data plane instance of the first logical switch is used to perform data forwarding according to the forwarding rule table.

In this embodiment of this application, that the SDN controller 10 determines a forwarding device for deployment of the data plane instance of the first logical switch may include a plurality of implementations, including:

Manner 1: The first request carries information about a designated forwarding device. The SDN controller 10 obtains the information about the designated forwarding device from the first request, and determines to deploy the data plane instance of the first logical switch on the designated forwarding device. There may be one or more designated forwarding devices. When there are a plurality of designated forwarding devices, the first forwarding device is any one of the plurality of designated forwarding devices.

Manner 2: The first request does not carry information about a designated forwarding device, and the SDN controller 10 assigns a forwarding device for deployment of the data plane instance of the first logical switch.

For example, when the first request is sent by the platform 30 to the SDN controller 10, the SDN controller 10 may select a forwarding device that is relatively close to the platform 30 as the first forwarding device for deployment of the data plane instance of the first logical switch, so that the first logical switch can respond to a data transmission requirement of the platform 30 more rapidly. A distance between the forwarding device and the platform 30 is a physical distance or a logical distance between the forwarding device and a server implementing functions of the platform 30. A logical distance between two devices may be measured by a quantity of intermediate network elements in a path between the two devices. When two devices are connected directly, the quantity of intermediate network elements is 0, and the logical distance is the shortest, followed by the logical distance when the two devices are connected via one intermediate network element, and so on.

For another example, the first request may carry information about a logical service that the first logical switch needs to be associated with. The SDN controller 10 determines a forwarding device capable of providing the logical service or a forwarding device that is relatively close to a service server providing the logical service, as the first forwarding device for deployment of the data plane instance of the first logical switch, so as to better satisfy service requirements of the user on the first logical switch.

Figure 3:
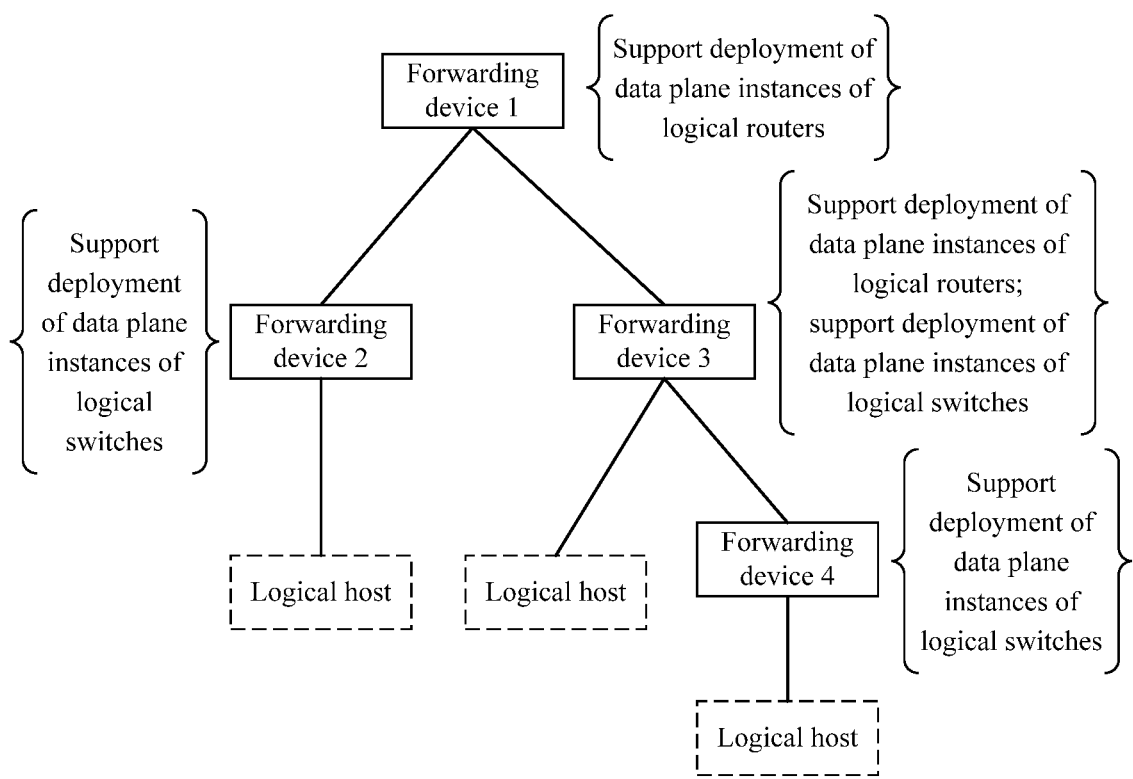
FIG. 3 is a schematic diagram of different types of forwarding devices according to an embodiment of this application.

For still another example, with reference to FIG. 3, some forwarding devices in a physical network may be configured for deployment of only data plane instances of logical switches, for example, a forwarding device 2 and a forwarding device 4 in FIG. 3; other forwarding devices may be configured for deployment of only data plane instances of logical routers, for example, a forwarding device 1 in FIG. 3; and still other devices may be configured for deployment of both data plane instances of logical switches and data plane instances of logical routers, for example, a forwarding device 3 in FIG. 3. After receiving the first request, the SDN controller 10 selects a forwarding device that supports deployment of the data plane instance of the logical switch as the first forwarding device. Optionally, a forwarding device may be configured for deployment of neither a data plane instance of a logical switch, nor a data plane instance of a logical router. These different types of forwarding devices may be configured by a user, or may be configured by the SDN controller 10 based on attributes, service processing capabilities or locations of the forwarding devices. For example, when a plurality of forwarding devices form a tree topology structure, a forwarding device located at the top of the tree topology structure may be configured for deployment of only data plane instances of logical routers, a forwarding device located at the middle of the tree topology structure may be configured for deployment of both data plane instances of logical switches and data plane instances of logical routers, and a forwarding device located at the bottom of the tree topology structure may be configured for deployment of only data plane instances of logical switches. Such configurations for the forwarding devices can improve flexibility of deploying data plane instances of logical forwarding devices.

It should be noted that the plurality of possible implementations introduced in Manner 2 may be combined to form more implementations.

With steps 401 to 403, a logical switch can be created in an SDN network. One logical switch may include one control plane instance and one or more data plane instances. When a logical switch includes a plurality of data plane instances, each data plane instance of the logical switch is deployed according to step 403. A creating process of a logical router is consistent with the creating process of a logical switch, and therefore no more details are described herein.

Figure 4:
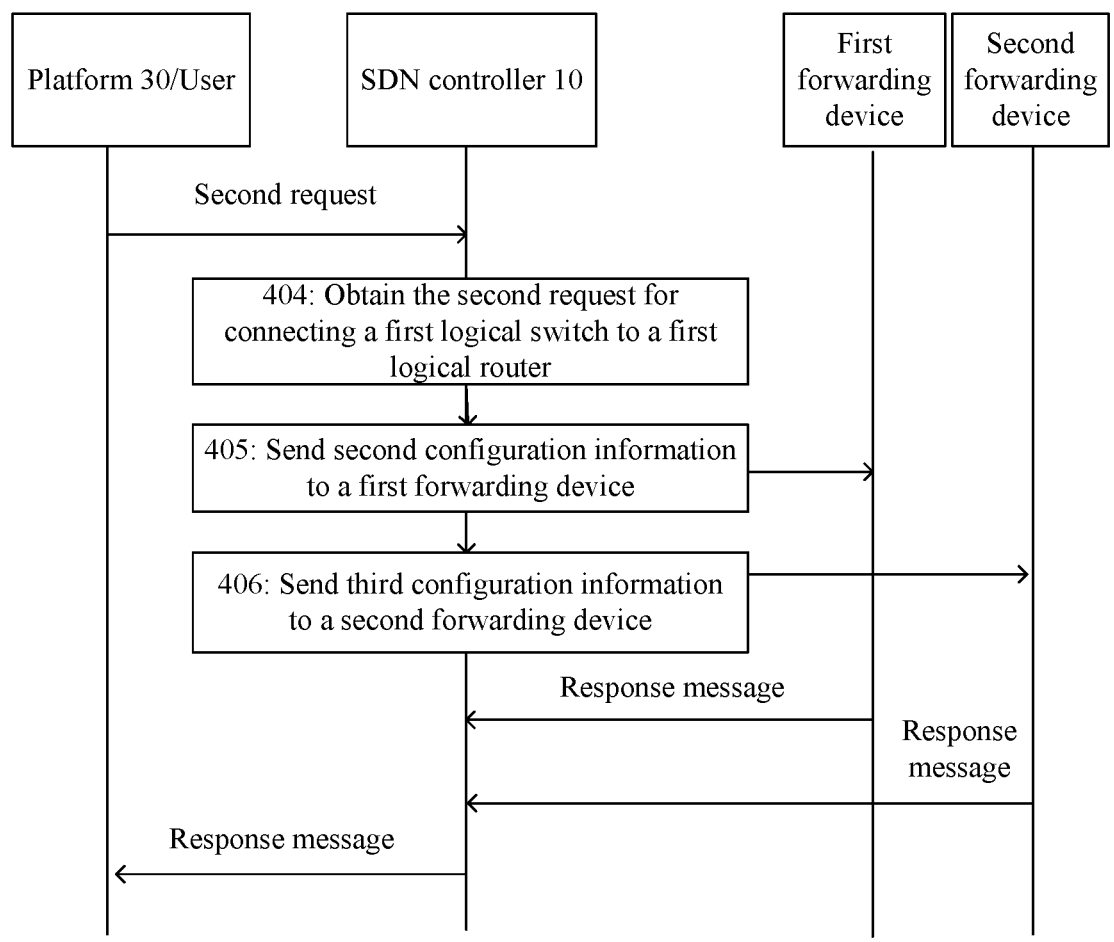
FIG. 4 is a schematic diagram of connecting a first logical switch to a first logical router according to an embodiment of this application.

With reference to FIG. 4, the following introduces a process of connecting a logical switch to a logical router, including the following steps.

Step 404: The SDN controller 10 obtains a second request for connecting the first logical switch to a first logical router.

Step 405: The SDN controller 10 sends second configuration information to the first forwarding device, where the second configuration information is used to instruct the first forwarding device to configure a first port of the data plane instance of the first logical switch to be communicatively connected to a second port of a data plane instance of the first logical router on a second forwarding device configured with the data plane instance of the first logical router. In this embodiment of this application, that two ports are communicatively connected means that a communicative connection is established between the two ports. For example, when the first port is communicatively connected to the second port, it indicates that a communications connection is established between the first port and the second port. Data transmission can be performed between the data plane instance of the first logical router and the data plane instance of the first logical switch through the communications connection between the first port and the second port. In some embodiments, the first forwarding device has not created the first port. In this case, the SDN controller 10 first sends, to the first forwarding device, configuration information instructing the first forwarding device to create the first port, and sends the second configuration information to the first forwarding device after the first port is created successfully.

Step 406: The SDN controller 10 sends third configuration information to the second forwarding device, where the second configuration information is used to instruct the first forwarding device to configure the first port of the data plane instance of the first logical switch to be communicatively connected to the second port of the data plane instance of the first logical router on the second forwarding device, and the third configuration information is used to instruct the second forwarding device to configure the second port to be communicatively connected to the first port. In some embodiments, the second forwarding device has not created the second port. In this case, the SDN controller 10 first sends, to the second forwarding device, configuration information instructing the second forwarding device to create the second port, and sends the third configuration information to the second forwarding device after the second port is created successfully.

By repeating step 401 to step 406, logical switches and logical routers can be created, and the logical switches can be connected to the logical routers to form an SDN network. Because functions of a logical router and a logical switch may be corresponding to those of a physical router and a physical switch, this makes it easy for a user to understand an SDN network architecture, and helps the user orchestrate an SDN network. In addition, when an SDN network is orchestrated based on logical routers and logical switches, an existing network management system and existing tools can be conveniently transplanted into the SDN network, facilitating the ease of detection, configuration, testing, and the like of SDN network elements.

Figure 5:
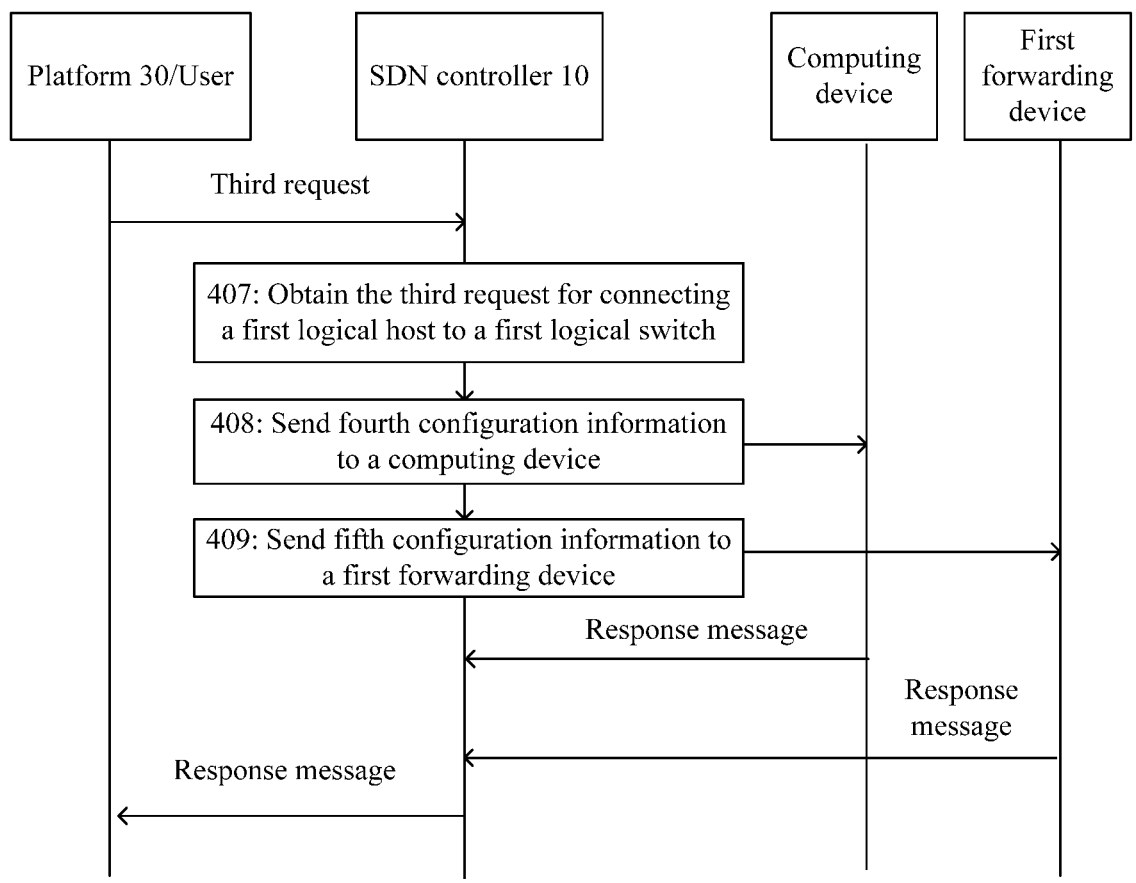
FIG. 5 is a schematic diagram of connecting a logical host to a first logical switch according to an embodiment of this application.

With reference to FIG. 5, the following introduces a process of connecting a logical host to an SDN network, including the following steps.

Step 407: The SDN controller 10 obtains a third request for connecting a first logical host to the first logical switch. The logical host may be a virtual machine, a physical device or some functional entities of a physical device, a virtual machine cluster including a plurality of virtual machines, a device cluster including a plurality of physical devices, or some functional entities of a device cluster including a plurality of physical devices. For example, the logical host may be a Dynamic Host Configuration Protocol server (Dynamic Host Configuration Protocol Server, DHCP Server) or a value added service (value added service, VAS) entity.

One implementation for the SDN controller 10 to obtain the third request is that the SDN controller 10 receives the third request from a platform 30, or that a user enters a command to the SDN controller 10 to input the third request. Another implementation for the SDN controller 10 to obtain the third request is: The SDN controller 10 receives a fourth request for connecting the first logical host to an SDN network, determines, based on a topology structure of a physical network, to connect an instance of the first logical host to the data plane instance of the first logical switch on the first forwarding device, and generates the third request for connecting the first logical host to the first logical switch, so as to obtain the third request. In other words, the platform 30 or the user does not specify which logical switch the logical host is connected to, and the SDN controller 10 determines the logical switch to which the logical host is connected. For a determining manner, reference may be made to the plurality of implementations introduced in Manner 2 in step 403. For example, the SDN controller 10 determines to connect the logical host to a data plane instance of a logical switch on a forwarding device that is relatively close to a computing device on which an instance of the logical host is located, or connect the logical host to a data plane instance of a logical switch on a forwarding device with a relatively light load.

Step 408: The SDN controller 10 sends fourth configuration information to a computing device configured with an instance of the first logical host, where the fourth configuration information is used to instruct the computing device to configure a third port of the instance of the first logical host to be communicatively connected to a fourth port of the data plane instance of the first logical switch on the first forwarding device. If the computing device has not created the third port, the SDN controller 10 first sends, to the computing device, configuration information instructing the computing device to create the third port, and sends the fourth configuration information to the computing device after the third port is created successfully.

Step 409: The SDN controller 10 sends fifth configuration information to the first forwarding device, where the fifth configuration information is used to instruct the first forwarding device to configure the fourth port to be communicatively connected to the third port. If the first forwarding device has not created the fourth port, the SDN controller 10 first sends, to the first forwarding device, configuration information instructing the first forwarding device to create the fourth port and sends the fifth configuration information to the first forwarding device after the fourth port is created successfully.

The logical host can be quickly connected to the SDN network by using the technical solution in step 406 to step 409.

Optionally, when the first logical switch includes a plurality of data plane instances, any two data plane instances of the first logical switch may be connected. That is, ports of the two data plane instances are communicatively connected. All data plane instances of the first logical switch may be connected to form a star topology structure, where one data plane instance acts as a center, and the rest data plane instances are all connected to the center data plane instance. All data plane instances of the first logical switch may be connected to form a mesh topology structure, where all data plane instances of the first logical switch are connected in pairs. Alternatively, all data plane instances of the first logical switch may be connected to form a tree topology structure, a serial topology structure, or the like. Likewise, two data plane instances of a logical router may be connected in the same way. When different data plane instances of a logical switch or a logical router are connected, flexibility and reliability of data forwarding can be improved.

Optionally, if the first logical switch has a plurality of data plane instances, when the first logical switch is connected to the first logical router, one or more or all data plane instances of the first logical switch may be connected to the data plane instance of the first logical router. To be specific, a port of the one or more or all data plane instances of the first logical switch is communicatively connected to a port of the data plane instance of the first logical router. In turn, if the first logical router has a plurality of data plane instances, when the first logical switch is connected to the first logical router, a port of one or more or all data plane instances of the first logical router may be communicatively connected to a port of the data plane instance of the first logical switch. If both the first logical switch and the first logical router include a plurality of data plane instances, one data plane instance of the first logical switch may be connected to one data plane instance of the first logic router. When the first logical switch has a plurality of data plane instances connected to data plane instances of the first router, different data plane instances of the first logical switch are connected to different data planes of the first logic router. The plurality of connection ways between the first logical switch and the first logical router may be specified by the platform 30 or the user based on a requirement of the platform 30 or the user, or may be determined by the SDN controller 10 based on the topology structure of the physical network or based on both the topology structure and a user requirement, so as to orchestrate a high-efficiency SDN network that satisfies the user requirement.

Optionally, if the first forwarding device is deployed with both the data plane instance of the first logical switch and the data plane instance of the first logical router, when the first logical switch is connected to the first logical router, the SDN controller 10 may communicatively connect the port of the data plane instance of the first logical switch on the first forwarding device to the port of the data plane instance of the first logical router on the first forwarding device. Because both the data plane instance of the first logical switch and the data plane instance of the first logical router are located on the first forwarding device, time consumed for data transmission between the first logical switch and the first logical router can be reduced, and data transmission efficiency of the SDN network can be improved.

Figure 6:
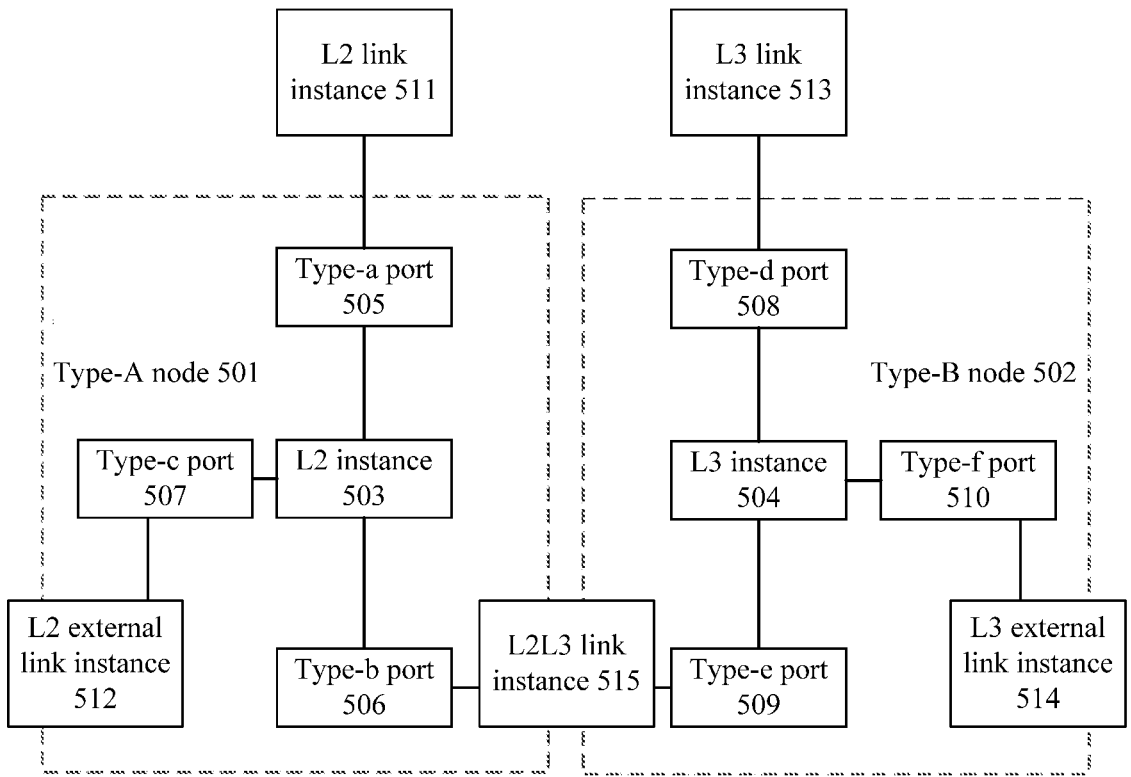
FIG. 6 is a schematic diagram of ports of data plane instances of a logical switch and a logical router in an SDN network.

The following introduces various ports of data plane instances of a logical switch and a logical router with reference to FIG. 6. In the figure, a type-A node 501 is a forwarding device configured to support deployment of data plane instances of logical switches, and a type-B node 502 is a forwarding device configured to support deployment of data plane instances of logical routers. An L2 instance 503 is a data plane instance of a logical switch, and an L3 instance 504 is a data plane instance of a logical router. A type-a port 505 is a port used for connecting different data plane instances of one logical switch, where the foregoing fifth port and sixth port are type-a ports 505. A type-b port 506 is a port, of a data plane instance of a logical switch, used for connecting to a data plane instance of a logical router, where the foregoing first port is a type-b port 506. A type-c port 507 is a port, of a data plane instance of a logical switch, used for connecting to an instance of a logical host, where the foregoing fourth port is a type-b port 507. A type-d port 508 is a port used for connecting different data plane instances of one logical router. A type-e port 509 is a port, of a data plane instance of a logical router, used for connecting to a data plane instance of a logical switch, where the foregoing second port is a type-e port 509. A type-f port 510 is a port, of a data plane instance of a logical router, used for connecting to a data plane instance of another logical router. An L2 link instance 511 is a link between different data plane instances of one logical switch. An L2 external link instance 512 is a link between data plane instances of a logical switch and a logical host. An L3 link instance 513 is a link between different data plane instances 504 of one logical router. An L3 external link instance 514 is a link between a data plane instance of one logical router and a data plane instance of another logical router, and is used for implementing communicative connection between a plurality of logical routers at a network layer. An L2L3 link instance 515 is a link between a data plane instance of a logical switch and a data plane instance of a logical router, and is used for implementing communicative connection between a link layer and the network layer.

Optionally, logical switches and logical routers may be further associated with logical services, for example, services such as mirroring, traffic diversion, quality of service (Quality of Service, QoS), security group, and DHCP relay. A process of associating a logical switch with a first logical service is as follows: The SDN controller 10 obtains a sixth request for associating the first logical switch with the first logical service; in response to the sixth request, determines an access port of an instance of the first logical service; and sends eighth configuration information to the first forwarding device, where the eighth configuration information is used to instruct the first forwarding device to configure a seventh port of the data plane instance of the first logical switch to be communicatively connected to the access port.

This request for associating with the first logical service may be sent by the platform 30, or may be generated by a direct entry operation of the user on the SDN controller 10. After receiving the sixth request, the SDN controller 10 searches for a service server providing the first logical service. A searching result falls in the following several cases:

Case 1: The SDN controller 10 finds that the service server providing the first logical service is the forwarding device deployed with the data plane instance of the first logical switch. The SDN controller 10 instructs the forwarding device to communicatively connect a port of the data plane instance of the first logical switch to a port of the first logical service.

Case 2: The SDN controller 10 finds that only one service server provides the first logical service, and that the service server is not the forwarding device deployed with the data plane instance of the first logical switch. The SDN controller 10 instructs the forwarding device deployed with the data plane instance of the first logical switch to communicatively connect to a port of the data plane instance of the first logical switch to a port of the first logical service on the service server. In some optional implementations, the SDN controller 10 further needs to instruct the service server to communicatively connect the port of the first logical service to the port of the data plane instance of the first logical switch on the first forwarding device.

Case 3: The SDN controller 10 finds that a plurality of service servers can provide the first logical service, and that the plurality of service servers do not include the forwarding device deployed with the data plane instance of the first logical switch. The SDN controller 10 selects one service server from the plurality of service servers as the first logical switch providing the first logical service. The service server may be any service server in the plurality of service servers, a service server in the plurality of service servers that is at a shortest distance to the forwarding device deployed with the data plane instance of the first logical switch, or a service server with a lightest load in the plurality of service servers. The SDN controller 10 instructs the forwarding device deployed with the data plane instance of the first logical switch to communicatively connect a port of the data plane instance of the first logical switch to a port of the first logical service on the selected service server.

It should be noted that, to associate a logical forwarding device with a logical service, in addition to communicatively connecting a port of the plane instance of the first logical switch to a port of the logical service, other necessary configurations may also be required, for example, granting a right of using the logical service to the logical forwarding device. The foregoing seventh port may be a type-c port 507, or may be a port of the logical switch for associating with a logical service that is different from type-a, type-b, and type-c ports. A process of associating a logical router with a logical service is the same as the process of associating a logical switch with a logical service, and details are not repeated herein.

In this technical solution, the SDN controller 10 communicatively connects the port of the logical forwarding device to the port of the logical service, thereby associating the logical forwarding device with the logical service.

Optionally, the SDN controller 10 generates, by using a controller service layer 111, configuration information to be delivered to the forwarding device, and sends the configuration information to a device driver 14. The device driver 14 converts the configuration information sent by the controller service layer 111 into a form specified in a protocol of the forwarding device. For example, if the forwarding device deployed with the data plane instance of the logical switch is a hardware device, the configuration information generated by the controller service layer 111 is converted into a virtual routing and forwarding (Virtual Routing Forwarding, VRF) table; and if the forwarding device deployed with the data plane instance of the logical switch is a software module, the configuration information generated by the controller service layer 111 is converted into a network layer flow table. Then, the configuration information resulting from the conversion is sent to the forwarding device through a management channel between the device driver 14 and the forwarding device. The management channel may be a channel based on a protocol such as the Network Configuration Protocol (Network Configuration Protocol, NetConf), the OpenFlow (OpenFlow) protocol or the Interface to the Routing System (Interface to Routing System, I2RS) protocol. In some optional implementations, after generating the configuration information to be delivered to the forwarding device, the controller service layer 111 searches for a device driver 14 supporting the forwarding device, and sends the configuration information to the found device driver 14. It should be noted that the configuration information that is generated by the controller service layer 111 and delivered to the forwarding device may be configuration information instructing the forwarding device to create a logical router, create a logical switch, create a port, configure communicative connection of one port to another port, or the like.

Figure 7:
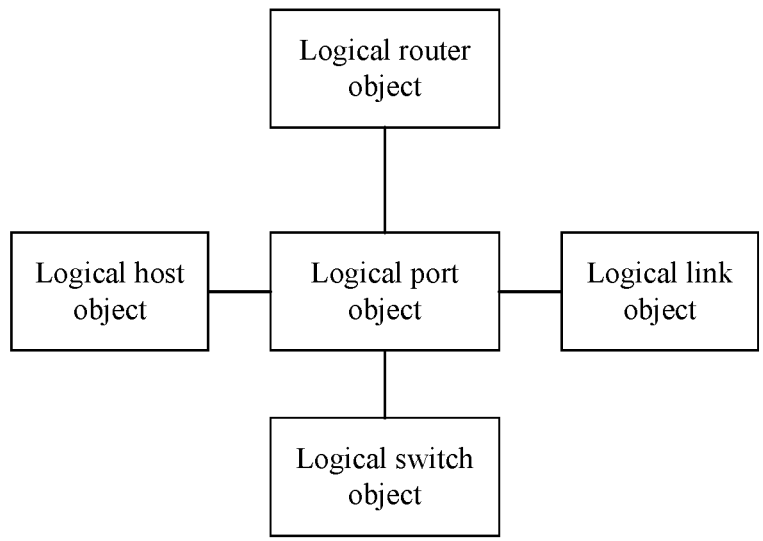
FIG. 7 is a schematic diagram of an SDN network orchestration interface according to an embodiment of this application.

Optionally, the SDN controller 10 may present a network orchestration interface to a user by using a UI module 12. FIG. 7 is a schematic diagram of the interface. The interface includes operable objects, and the operable objects include logical switch objects, logical router objects, logical host objects, port objects, and logical link objects. The logical switch object is used to create a logical switch, the logical router object is used to create a logical router; the logical host object is used to connect a logical host to an SDN network; the port object is used to create a port for a logical switch, a logical router, or a logical host; and the logical link object is used to create a logical link between two ports. It should be noted that in addition to the operable objects, the interface shown in FIG. 8 may further display a menu, help information, and the like.

The network orchestration interface presented to the user may be presented to one or more platforms 30, so that a user using the platform 30 can orchestrate an SDN network by using the interface. For example, the user selects, by using the interface displayed by the platform 30, a logical switch object to create a logical switch, selects a logical router object to create a logical router, selects port objects to create ports for the logical router and the logical switch, and selects a logical link object to create a logical link between the ports created for the logical router and the logical switch. The network orchestration interface presented to the user may alternatively be presented to the user by using a display of a physical device on which the SDN controller 10 is located, and a user can directly select operable objects in the interface on the physical device to implement SDN network orchestration.

In this technical solution, the SDN controller 10 can provide an SDN network orchestration interface to a user, where object functions in the interface are consistent with functions of steps of orchestrating a physical network, so that the user can use the interface to orchestrate an SDN network.

Optionally, after receiving an SDN network orchestration request (for example, a request for creating a logical switch, a request for creating a logical router, a request for connecting a logical switch to a logical router, or a request for connecting a logical host to a logical switch) sent by the platform 30 or the user by using the UI module 12, a SDN controller core 11 may first return a request success message to the platform or the UI module 12 instead of delivering configuration information to the forwarding device, and delivers all configuration information to the forwarding device after all SDN network orchestration operations of the platform or the user are completed, to complete the SDN network orchestration requested by the platform or the user. With this implementation, a time for the user to wait for the SDN controller core 11 to return a response message can be reduced. In addition, configuration information corresponding to a plurality of operations (for example, creating a logical router, creating a logical switch, and connecting the logical switch to the logical router) is delivered to the forwarding device at a time. This can reduce a transmission time for delivering the configuration information and a time for returning a configuration success message, thereby reducing time consumption of SDN network orchestration and improving efficiency of SDN network orchestration.

Optionally, the SDN controller 10 in this embodiment of this application may provide the SDN network orchestration service for a plurality of platforms 30. The plurality of platforms 30 may be of different types and have different service models. A platform application 13 of the SDN controller 10 may convert service models of the platforms 30 into a uniform network service model, for example, a network service model shown in FIG. 1, so that platforms 30 with different service models can all orchestrate an SDN network through the SDN controller 10.

Optionally, in addition to using the uniform network service model provided by the service model module 112 of the controller 10 to orchestrate an SDN network, a platform 30 can also use a service model of the platform 30 itself to orchestrate an SDN network. For example, when the user orchestrates the SDN network by using a Neutron model of an OpenStack platform, another implementation of step 401 may be: The platform 30 sends, to the SDN controller 10, a request for creating a logical network, the SDN controller 10 saves information about the logical network, for example, an identifier of a logical router to which the logical network is connected and an identifier of the logical network, and then returns, to the platform 30, a message about successful creation of the logical network. Then, the platform 30 sends, to the SDN controller 10, a request for creating a logical subnet of the logical network, and the SDN controller 10 determines, based on the request for creating a logical subnet and the saved information about the logical network, to create the first logical switch, and obtains the first request for creating the first logical switch. Further, if the request for creating a logical network carries a message indicating that the logical network is to be connected to the first logical router, step 403 may be automatically triggered by the SDN controller 10 after the first logical switch is created successfully, so as to improve efficiency of SDN network orchestration.

In this technical solution, the SDN controller 10 can support a platform 30 in orchestrating an SDN network based on a service model of the platform 30 itself, thereby improving compatibility of the SDN controller 10 with existing platforms 30.

Figure 8:
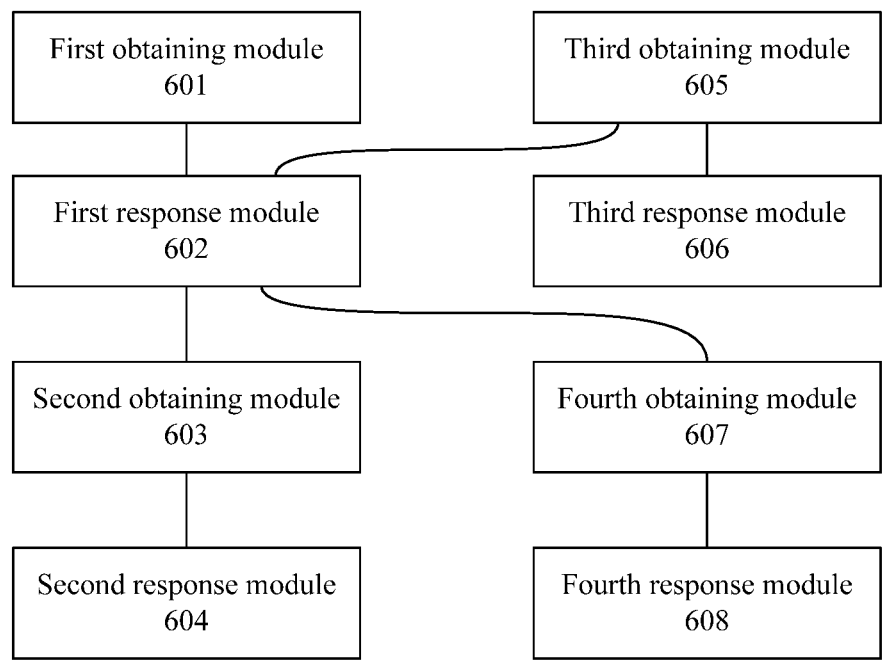
FIG. 8 is a schematic diagram of an SDN controller according to an embodiment of this application.

FIG. 8 is a schematic diagram of an SDN controller according to an embodiment of this application. The SDN controller includes:

a first obtaining module 601, configured to obtain a first request for creating a first logical switch;

a first response module 602, configured to, in response to the first request, create a control plane instance of the first logical switch, determine to deploy a data plane instance of the first logical switch on a first forwarding device, and send first configuration information to the first forwarding device, where the first configuration information is used to instruct the first forwarding device to configure the data plane instance of the first logical switch; the control plane instance of the first logical switch is used to run a communications protocol, generate a forwarding rule table, and send the forwarding rule table to the data plane instance of the first logical switch; and the data plane instance of the first logical switch is used to perform data forwarding according to the forwarding rule table;

a second obtaining module 603, configured to obtain a second request for connecting the first logical switch to a first logical router; and a second response module 604, configured to, in response to the second request, send second configuration information to the first forwarding device, and send third configuration information to a second forwarding device configured with a data plane instance of the first logical router, where the second configuration information is used to instruct the first forwarding device to configure a first port of the data plane instance of the first logical switch to be communicatively connected to a second port of the data plane instance of the first logical router on the second forwarding device, and the third configuration information is used to instruct the second forwarding device to configure the second port to be communicatively connected to the first port.

Optionally, the SDN controller further includes:

a third obtaining module 605, configured to obtain, after the first response module sends first configuration information to the first forwarding device, a third request for connecting a first logical host to the first logical switch; and a third response module 606, configured to send fourth configuration information to a computing device configured with an instance of the first logical host, where the fourth configuration information is used to instruct the computing device to configure a third port of the instance of the first logical host to be communicatively connected to a fourth port of the data plane instance of the first logical switch on the first forwarding device; and send fifth configuration information to the first forwarding device, where the fifth configuration information is used to instruct the first forwarding device to configure the fourth port to be communicatively connected to the third port.

Optionally, the third obtaining module 605 is configured to:

receive a fourth request for connecting the first logical host to an SDN network;

determine, based on a topology structure of a physical network, to connect the instance of the first logical host to the data plane instance of the first logical switch on the first forwarding device, where the physical network includes the first forwarding device and the computing device; and generate the third request for connecting the first logical host to the first logical switch, so as to obtain the third request.

Optionally, the first response module 602 is configured to:

obtain information that is carried in the first request and that is about a designated forwarding device, and determine to deploy the data plane instance of the first logical switch on the designated forwarding device, where the designated forwarding device includes the first forwarding device.

Optionally, the first response module 602 is configured to:

determine, based on the topology structure of the physical network, at least one forwarding device for deployment of the data plane instance of the first logical switch, where the at least one forwarding device includes the first forwarding device.

Optionally, the first response module is further configured to: after creating a control plane instance of the first logical switch, determine to deploy the data plane instance of the first logical switch on a third forwarding device, and send sixth configuration information to the third forwarding device, where the sixth configuration information is used to instruct the third forwarding device to configure the data plane instance of the first logical switch.

Optionally, the first configuration information is further used to instruct the first forwarding device to configure a fifth port of the first logical switch that is configured by the first forwarding device to be communicatively connected to a sixth port of the data plane instance of the first logical switch on the third forwarding device, and the sixth configuration information is further used to instruct the third forwarding device to configure the sixth port to be communicatively connected to the fifth port.

Optionally, the SDN controller further includes:

a fourth obtaining module 607, configured to obtain, after the first response module sends first configuration information to the first forwarding device, a sixth request for associating the first logical switch with a first logical service; and a fourth response module 608, configured to, in response to the sixth request, determine an access port of an instance of the first logical service; and send eighth configuration information to the first forwarding device, where the eighth configuration information is used to instruct the first forwarding device to configure a seventh port of the data plane instance of the first logical switch to be communicatively connected to the access port.

In this embodiment of this application, the module division is an example and merely logical function division, and there may be other division manners in actual implementation. In addition, the functional modules in this embodiment of this application may be integrated into one processor, or each of the modules may exist alone physically, or two or more modules may be integrated into one module. The integrated module may be implemented in a form of hardware, or may be implemented in a form of a software functional module.

Figure 9:
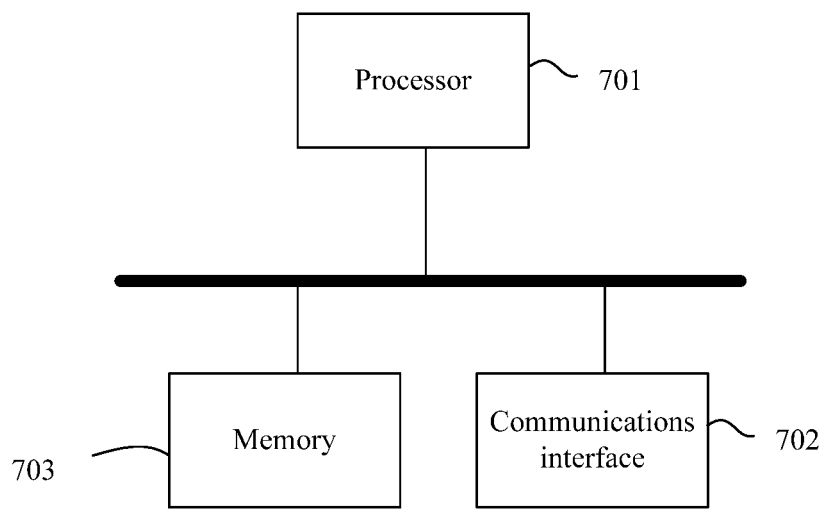
FIG. 9 is another schematic diagram of an SDN controller according to an embodiment of this application.

When an integrated module is implemented in a form of hardware, as shown in FIG. 9, an SDN controller may include a processor 701, a communications interface 702, and a memory 703. The processor 701 may include a central processing unit (central processing unit, CPU), a network processor (network processor, NP), or a combination of a CPU and an NP. The processor 701 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The processor 701 receives, by using the communications interface 702, a request sent by a user or a platform, and sends configuration information to a forwarding device.

The memory 703 is configured to store various configuration information related in the foregoing method, a topology structure of a physical network, and the like. The memory 703 is further configured to store program code executed by the processor 701. The memory 703 may be a non-volatile memory, for example, a hard disk drive (hard disk drive, HDD) or a solid-state drive (solid-state drive, SSD), or a volatile memory (volatile memory), for example, a random-access memory (random-access memory, RAM). The memory 703 may be any other computer-accessible media that can be used to carry or store expected program code in an instruction or data structure form, without being limited thereto though. The processor 701 is configured to execute the program code stored in the memory 703, and specifically configured to implement the method in the embodiments shown in FIG. 1 to FIG. 7.

This embodiment of the present invention does not define a specific connection medium between the processor 701, the communications interface 702, and the memory 703. In this embodiment of this application, the memory 703, the processor 701, and the communications interface 702 are connected by a bus in FIG. 9, where the bus is represented by a bold line in FIG. 9. This is only a schematic illustration and is not intended for limitation. There may be other connection manners between the components though. The bus may be classified into an address bus, a data bus, a control bus, and the like. For ease of representation, only one bold line is used to represent the bus in FIG. 9, but this does not mean that there is only one bus or only one type of bus.

An embodiment of this application further provides a computer-readable storage medium, where the computer-readable storage medium stores a computer instruction, and when the instruction is run on a computer, the computer executes the methods in the possible implementations of the SDN network orchestration method.

Obviously, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. A software defined networking (SDN) orchestration method, comprising:
    obtaining a first request for creating a first logical switch;
    in response to the first request, creating a control plane instance of the first logical switch, and sending first configuration information to a first forwarding device to instruct the first forwarding device to configure a data plane instance of the first logical switch, wherein the control plane instance of the first logical switch is configured to generate a forwarding rule table, and send the forwarding rule table to the data plane instance of the first logical switch to perform data forwarding according to the forwarding rule table;
    obtaining a second request for connecting the first logical switch to a first logical router; and
    in response to the second request,
        sending second configuration information to the first forwarding device to instruct the first forwarding device to configure a first port of the data plane instance of the first logical switch to be communicatively connected to a second port of the data plane instance of the first logical router on a second forwarding device, and
        sending third configuration information to the second forwarding device configured with a data plane instance of the first logical router to instruct the second forwarding device to configure the second port to be communicatively connected to the first port.

2. The method according to claim 1, wherein after sending the first configuration information to the first forwarding device, the method further comprises:
    obtaining a third request for connecting a first logical host to the first logical switch;
    sending fourth configuration information to a computing device configured with an instance of the first logical host to instruct the computing device to configure a third port of the instance of the first logical host to be communicatively connected to a fourth port of the data plane instance of the first logical switch on the first forwarding device; and
    sending fifth configuration information to the first forwarding device to instruct the first forwarding device to configure the fourth port to be communicatively connected to the third port.

3. The method according to claim 2, wherein the obtaining a third request for connecting a first logical host to the first logical switch comprises:
    receiving a fourth request for connecting the first logical host to an SDN network;
    determining, based on a topology structure of a physical network, to connect the instance of the first logical host to the data plane instance of the first logical switch on the first forwarding device, wherein the physical network comprises the first forwarding device and the computing device; and
    generating the third request for connecting the first logical host to the first logical switch to obtain the third request.

4. The method according to claim 1, further comprising:
    obtaining information from the first request indicating a designated forwarding device, and
    deploying the data plane instance of the first logical switch on the designated forwarding device, wherein the designated forwarding device comprises the first forwarding device.

5. The method according to claim 3, wherein the deploying a data plane instance of the first logical switch on a first forwarding device comprises:
    determining, based on the topology structure of the physical network, at least one forwarding device for deployment of the data plane instance of the first logical switch, wherein the at least one forwarding device comprises the first forwarding device.

6. The method according to claim 1, wherein after creating the control plane instance of the first logical switch, the method further comprises:
    deploying the data plane instance of the first logical switch on a third forwarding device; and sending sixth configuration information to the third forwarding device to instruct the third forwarding device to configure the data plane instance of the first logical switch.

7. The method according to claim 6, wherein the first configuration information further instructs the first forwarding device to configure a fifth port of the data plane instance of the first logical switch that is configured by the first forwarding device to be communicatively connected to a sixth port of the data plane instance of the first logical switch on the third forwarding device, and the sixth configuration information further instructs the third forwarding device to configure the sixth port to be communicatively connected to the fifth port.

8. The method according to claim 1, wherein after sending the first configuration information to the first forwarding device, the method further comprises:
obtaining a sixth request for associating the first logical switch with a first logical service;
in response to the sixth request, determining an access port of an instance of the first logical service; and
sending eighth configuration information to the first forwarding device to instruct the first forwarding device to configure a seventh port of the data plane instance of the first logical switch to be communicatively connected to the access port.

9. A software defined networking (SDN) controller, comprising:
one or more processors; and
one or more memories storing instructions, which when executed by the one or more processors, cause the SDN controller to:
obtain a first request for creating a first logical switch;
in response to the first request, create a control plane instance of the first logical switch, and send first configuration information to a first forwarding device to instruct the first forwarding device to configure a data plane instance of the first logical switch, wherein the control plane instance of the first logical switch is configured to generate a forwarding rule table, and send the forwarding rule table to the data plane instance of the first logical switch to perform data forwarding according to the forwarding rule table;
obtain a second request for connecting the first logical switch to a first logical router; and
in response to the second request,
send second configuration information to the first forwarding device to instruct the first forwarding device to configure a first port of the data plane instance of the first logical switch to be communicatively connected to a second port of the data plane instance of the first logical router on a second forwarding device, and
send third configuration information to the second forwarding device configured with a data plane instance of the first logical router to instruct the second forwarding device to configure the second port to be communicatively connected to the first port.

10. The SDN controller according to claim 9, wherein the SDN controller is further caused to:
obtain, after sending first configuration information to the first forwarding device, a third request for connecting a first logical host to the first logical switch; and
send fourth configuration information to a computing device configured with an instance of the first logical host to instruct the computing device to configure a third port of the instance of the first logical host to be communicatively connected to a fourth port of the data plane instance of the first logical switch on the first forwarding device; and
send fifth configuration information to the first forwarding device to instruct the first forwarding device to configure the fourth port to be communicatively connected to the third port.

11. The SDN controller according to claim 10, wherein the SDN controller is further caused to:
receive a fourth request for connecting the first logical host to an SDN network;
determine, based on a topology structure of a physical network, to connect the instance of the first logical host to the data plane instance of the first logical switch on the first forwarding device, wherein the physical network comprises the first forwarding device and the computing device; and
generate the third request for connecting the first logical host to the first logical switch to obtain the third request.

12. The SDN controller according to claim 9, wherein the SDN controller is further caused to:
obtain information from the first request indicating a designated forwarding device, and
deploy the data plane instance of the first logical switch on the designated forwarding device, wherein the designated forwarding device comprises the first forwarding device.

13. The SDN controller according to claim 11, wherein the SDN controller is further caused to:
determine, based on the topology structure of the physical network, at least one forwarding device for deployment of the data plane instance of the first logical switch, wherein the at least one forwarding device comprises the first forwarding device.

14. The SDN controller according to claim 9, wherein the SDN controller is further caused to:
after creating a control plane instance of the first logical switch, deploy the data plane instance of the first logical switch on a third forwarding device, and
send sixth configuration information to the third forwarding device to instruct the third forwarding device to configure the data plane instance of the first logical switch.

15. The SDN controller according to claim 14, wherein the first configuration information further instructs the first forwarding device to configure a fifth port of the first logical switch that is configured by the first forwarding device to be communicatively connected to a sixth port of the data plane instance of the first logical switch on the third forwarding device, and the sixth configuration information further instructs the third forwarding device to configure the sixth port to be communicatively connected to the fifth port.

16. The SDN controller according to claim 9, wherein the SDN controller is further caused to:
obtain, after sending first configuration information to the first forwarding device, a sixth request for associating the first logical switch with a first logical service; and
in response to the sixth request, determine an access port of an instance of the first logical service; and send eighth configuration information to the first forwarding device, wherein the eighth configuration information instructs the first forwarding device to configure a seventh port of the data plane instance of the first logical switch to be communicatively connected to the access port.

17. A network system, comprising:
a software defined networking (SDN) controller, a first forwarding device, and a second forwarding device;
wherein the SDN controller is configured to:
obtain a first request for creating a first logical switch;
in response to the first request, create a control plane instance of the first logical switch, deploy a data plane instance of the first logical switch on a first forwarding device, and sending first configuration information to the first forwarding device to instruct the first forwarding device to configure a data plane instance of the first logical switch, wherein the control plane instance of the first logical switch is configured to generate a forwarding rule table, and send the forwarding rule table to the data plane instance of the first logical switch to perform data forwarding according to the forwarding rule table;
obtain a second request for connecting the first logical switch to a first logical router; and
in response to the second request,
send second configuration information to the first forwarding device to instruct the first forwarding device to configure a first port of the data plane instance of the first logical switch to be communicatively connected to a second port of the data plane instance of the first logical router on the second forwarding device, and
send third configuration information to the second forwarding device configured with a data plane instance of the first logical router to instruct the second forwarding device to configure the second port to be communicatively connected to the first port.

18. The controller according to claim 17, wherein the SDN controller is further configured to:
obtain a third request for connecting a first logical host to the first logical switch;
send fourth configuration information to a computing device configured with an instance of the first logical host to instruct the computing device to configure a third port of the instance of the first logical host to be communicatively connected to a fourth port of the data plane instance of the first logical switch on the first forwarding device; and
send fifth configuration information to the first forwarding device to instruct the first forwarding device to configure the fourth port to be communicatively connected to the third port.

19. The controller according to claim 18, wherein the SDN controller is further configured to:
receive a fourth request for connecting the first logical host to an SDN network;
determine, based on a topology structure of a physical network, to connect the instance of the first logical host to the data plane instance of the first logical switch on the first forwarding device, wherein the physical network comprises the first forwarding device and the computing device; and
generate the third request for connecting the first logical host to the first logical switch, so as to obtain the third request.

20. The controller according to claim 17, wherein the SDN controller is further configured to:
obtain information from the first request indicating a designated forwarding device, and
determine to deploy the data plane instance of the first logical switch on the designated forwarding device, wherein the designated forwarding device comprises the first forwarding device.

* * * * *